United States Patent
Zhang et al.

(10) Patent No.: US 12,021,302 B1
(45) Date of Patent: Jun. 25, 2024

(54) ANALYSIS METHOD FOR TRANSMISSION AND REFLECTION COEFFICIENTS OF WIRE MESH OF MESH ANTENNA

(71) Applicant: Xidian University, Xi'an (CN)

(72) Inventors: Yiqun Zhang, Xi'an (CN); Jianli Yang, Xi'an (CN); Zhuolin Li, Xi'an (CN); Zhilong Tan, Xi'an (CN); Yusheng Li, Xi'an (CN); Qingyan Qin, Xi'an (CN); Xiaofei Wu, Xi'an (CN); Yongxi He, Xi'an (CN); Naigang Hu, Xi'an (CN); Na Li, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 18/431,978

(22) Filed: Feb. 4, 2024

(30) Foreign Application Priority Data

Feb. 10, 2023 (CN) .......................... 202310101542.7

(51) Int. Cl.
*H01Q 15/00* (2006.01)
(52) U.S. Cl.
CPC ............................... *H01Q 15/0046* (2013.01)
(58) Field of Classification Search
CPC ..................... H01Q 15/0046; H01Q 15/168
See application file for complete search history.

(56) References Cited

U.S. PATENT DOCUMENTS

| | | | | |
|---|---|---|---|---|
| 10,256,530 B2 * | 4/2019 | Freebury | ................ | H01Q 1/288 |
| 11,056,797 B2 * | 7/2021 | Rommel | .............. | H01Q 15/168 |
| 11,791,563 B1 * | 10/2023 | Zhang | .................. | H01Q 1/1235 |
| | | | | 343/702 |
| 2015/0194733 A1 * | 7/2015 | Mobrem | .............. | H01Q 15/161 |
| | | | | 343/915 |
| 2015/0244081 A1 * | 8/2015 | Mobrem | .............. | H01Q 15/161 |
| | | | | 343/915 |

OTHER PUBLICATIONS

CNIPA, Notification of First Office Action for CN202310101542.7, Sep. 8, 2023.
Xidian University (Applicant), Reply to Notification of First Office Action for CN202310101542.7, w/ (allowed) replacement claims, Oct. 10, 2023.
CNIPA, Notification to grant patent right for invention in CN202310101542.7, Oct. 31, 2023.

\* cited by examiner

*Primary Examiner* — Awat M Salih
(74) *Attorney, Agent, or Firm* — Zhigang Ma

(57) ABSTRACT

Provided is an analysis method for transmission and reflection coefficients of a wire mesh of a mesh antenna. The method mainly derives coordinate points of a minimum repeating unit of the wire mesh according to model parameters of the wire mesh; secondly, determines a minimum repeating unit curve of the wire mesh by periodic cubic spline curve interpolation, and determines an organization structure of the wire mesh by vector superposition; thirdly, discretizes an organization structure curve of the organization structure of the wire mesh, to extract a coordinate point of an electromagnetic analysis periodic unit of the wire mesh, and establishes a solid model of the electromagnetic analysis periodic unit of the wire mesh to realize the analysis of the transmission coefficient and the reflection coefficient of the wire mesh; and finally, determines the transmission coefficient and the reflection coefficient of the deformed wire mesh by static analysis.

7 Claims, 7 Drawing Sheets

ANALYSIS METHOD FOR TRANSMISSION AND REFLECTION COEFFICIENTS OF WIRE MESH OF MESH ANTENNA

TECHNICAL FIELD

The disclosure relates to the technical field of mesh antennas, particularly to an analysis method for transmission and reflection coefficients of a wire mesh of a mesh antenna.

BACKGROUND

With the development of science and technology, there is an increasing demand for deployable antennas with larger aperture, higher precision and lighter weight in fields, such as, satellite communication, electronic reconnaissance, and microwave remote sensing, and a mesh deployable antenna is the most widely used type of the deployable antennas. The mesh deployable antenna is mainly composed of a cable net system and a wire mesh. The cable net system approaches a paraboloid through multiple small patches, and the wire mesh is laid on the cable net system to reflect electromagnetic waves instead of a solid surface. The reflection and transmission performance of the wire mesh ultimately affect the performance of the mesh deployable antenna.

At present, there are two main methods for analyzing the reflection and transmission performance of the wire mesh at home and abroad. In one method, Professor YAHYA RAH-MAT-SAMII equated the wire mesh with a pore unit for analyzing the reflection and transmission performance of the wire mesh in an article "Vector Diffraction Analysis of Reflector Antennas with Mesh Surfaces" in a journal of "TRANSACTIONS ON ANTENNAS AND PROPAGATION" in the year of 1985. In the other method, Professor Amane Miure equated the wire mesh with a strip unit for analyzing the reflection and transmission performance of the wire mesh in an article "Analysis of Mesh Reflector Antennas with Complex Mesh Surfaces Using Physical Optics Combined with periodic Method of Moments" in a journal of "Asia-Pacific Microwave Conference Proceedings" in the year of 2005. However, the above two methods have some limitations: first, each of the above two methods adopts approximate analysis based on a equivalent model of the wire mesh, and a corresponding analysis result has a certain error; second, for the mesh deployable antenna, in order to ensure the stability of a profile accuracy, there is a certain tension in the cable-net system, and the wire mesh is deformed when it is laid on the cable net system, and the reflection and transmission coefficients thereof will change, which is not considered by the above two methods. Therefore, it is necessary to put forward a method that can be used to analyze the transmission and reflection coefficients of the wire mesh before and after deformation owning to a tension.

SUMMARY

An objective of the disclosure is to provide an analysis method for transmission and reflection coefficients of a wire mesh of a mesh antenna, which establishes an accurate wire mesh model and can be used for analyzing the reflection coefficient and the transmission coefficient of the wire mesh before and after deformation owning to a tension.

An embodiment of the disclosure provides an analysis method for transmission and reflection coefficients of a wire mesh of a mesh antenna, which includes:
  step 1, inputting model parameters and simulation parameters of the wire mesh;
  step 2, obtaining coordinate points of a minimum repeating unit of the wire mesh, and determining a minimum repeating unit curve $P_{00}$ of the minimum repeating unit;
  step 3, performing vector superposition on the minimum repeating unit curve $P_{00}$ to obtain an organization structure curve P of an organization structure of the wire mesh;
  step 4, discretizing the organization structure curve P of the organization structure of the wire mesh obtained in the step 3, to extract a coordinate point elec_node of an electromagnetic analysis periodic unit of the wire mesh;
  step 5, establishing, based on the coordinate point elec_node of the electromagnetic analysis periodic unit of the wire mesh obtained in the step 4, a solid model of the electromagnetic analysis periodic unit of the wire mesh, and obtaining a reflection coefficient S11 and a transmission coefficient S21 of the wire mesh by analyzing the solid model; and step 6, determining a reflection coefficient S11 and a transmission coefficient S21 of the wire mesh after deformation.

In an embodiment, in the step 1, the model parameters include: the organization structure P of the wire mesh, a coil height b of the wire mesh, a row-column spacing w of the wire mesh, a wire diameter d, and a coil inclination angle $\alpha$ of the wire mesh; and the simulation parameters include: a wire material, a load on the wire mesh, a Poisson ratio of the wire material, an elastic modulus of the wire material, a density of the wire material, a working frequency, and an incident angle of an electromagnetic wave In an embodiment, the step 2 specifically includes:
  step 2.1, deriving coordinate points $A_1$ of a single inclined coil of the wire mesh according to the model parameters in the step 1;
  step 2.2, obtaining the coordinate points of the minimum repeating unit of the wire mesh according to the coordinate points $A_1$ of the single inclined coil obtained in the step 2.1 and the organization structure P of the wire mesh of the model parameters in the step 1; and
  step 2.3, solving the minimum repeating unit curve $P_{00}$ of the wire mesh according to the coordinate points of the minimum repeating unit obtained in the step 2.2.

In an embodiment, the step 2.1 specifically includes:
  step 2.11, describing, based on the model parameters in the step 1 and multiple coordinate points obtained by a computer simulation experiment in the related art "Three-dimensional model of warp knitted fabric based on non uniform rational B-spline (NURBS) curve", a single basic coil of the wire mesh, to obtain a coordinate point matrix A of the single basic coil;
  step 2.12, adjusting, by using a rotation matrix $T_1$, the coordinate point matrix A of the single basic coil through a formula 2.1 to thereby obtain the coordinate points $A_1$ of the single inclined coil:

$$A_1 = A \cdot T_1 \qquad (2.1),$$

where the rotation matrix $T_1$ is expressed in a formula 2.2:

$$T_1 = \begin{bmatrix} \cos\alpha & -\sin\alpha & 0 \\ \sin\alpha & \cos\alpha & 0 \\ 0 & 0 & 1 \end{bmatrix}, \qquad (2.2)$$

where $\alpha$ represents a coil inclination angle of the wire mesh.

In an embodiment, the step 2.2 specifically includes:

step 2.21, determining, based on the organization structure P of the wire mesh, a topological relationship between the minimum repeating unit and the single inclined coil; and step 2.22, obtaining the coordinate points of the minimum repeating unit of the wire mesh according to the coordinate points $A_1$ of the single inclined coil obtained in the step 2.1 and the topological relationship obtained in the step 2.21.

In an embodiment, the step 2.3 includes: obtaining the minimum repeating unit curve of the wire mesh by performing interpolating on the coordinate points of the minimum repeating unit obtained in the step 2.2 by using a periodic cubic spline curve, which includes:

step 2.31, determining an incremental sequence, in which, $u_1 < u_2 < \ldots u_n$, and $\Delta u = u_{i+1} - u_i = 1$, (i=1, 2, ..., n−1), and expressing n−1 sub-curves of each composition curve l described by n coordinate points of the minimum repeating unit of the wire mesh as $s_i(u-u_i)$, where i=1, 2, ..., n−1, and $u \in [u_i, u_{i+1}]$, $s_i(u-u_i)$ is expressed in a formula 2.3:

$$s_i(u-u_i) = \begin{cases} x_i(u-u_i) = a_{ix} + b_{ix}(u-u_i) + c_{ix}(u-u_i)^2 + d_{ix}(u-u_i)^3 \\ y_i(u-u_i) = a_{iy} + b_{iy}(u-u_i) + c_{iy}(u-u_i)^2 + d_{iy}(u-u_i)^3 \, i \in (1, 2, \ldots, n-1), \\ z_i(u-u_i) = a_{iz} + b_{iz}(u-u_i) + c_{iz}(u-u_i)^2 + d_{iz}(u-u_i)^3 \end{cases} \quad (2.3)$$

where $a_{ix}$, $b_{ix}$, $c_{ix}$, $d_{ix}$, $a_{iy}$, $b_{iy}$, $c_{iy}$, $d_{iy}$, $a_{iz}$, $b_{iz}$, $c_{iz}$, $d_{iz}$ represent undetermined coefficients corresponding to an analytic formula of an i-th sub-curve of the n−1 sub-curves, respectively, and i=1, 2, ..., n−1;

step 2.32, based on that first derivatives of first and last endpoints of the composition curve l are equal, and second derivatives of first and last endpoints of the composition curve l are equal, determining a formula 2.4:

$$\begin{cases} \dot{x}_1(u_1+0-u_1) = \dot{x}_{n-1}(u_n-0-u_{n-1}) \\ \dot{y}_1(u_1+0-u_1) = \dot{y}_{n-1}(u_n-0-u_{n-1}) \\ \dot{z}_1(u_1+0-u_1) = \dot{z}_{n-1}(u_n-0-u_{n-1}) \end{cases}, \begin{cases} \ddot{x}_1(u_1+0-u_1) = \ddot{x}_{n-1}(u_n-0-u_{n-1}) \\ \ddot{y}_1(u_1+0-u_1) = \ddot{y}_{n-1}(u_n-0-u_{n-1}) \\ \ddot{z}_1(u_1+0-u_1) = \ddot{z}_{n-1}(u_n-0-u_{n-1}) \end{cases} \quad (2.4)$$

step 2.33, based on that a function value of each of coordinate points excepting for endpoints of the composition curve l on the i-th sub-curve is equal to a function value of each of coordinate points excepting for the endpoints of the composition curve l on an i+1-th curve of the n−1 sub-curves, a first derivative of each of coordinate points excepting for the endpoints of the composition curve l on the i-th sub-curve is equal to a first derivative of each of coordinate points excepting for the endpoints of the composition curve l on the i+1-th curve of the n−1 sub-curves, and a second derivative of each of coordinate points excepting for the endpoints of the composition curve l on the i-th sub-curve is equal to a second derivative of each of coordinate points excepting for the endpoints of the composition curve l on the i+1-th curve of the n−1 sub-curves, determining a formula 2.5:

$$\begin{cases} x_{i-1}(u_i - u_{i-1}) = x_i(u_i - u_i) \\ y_{i-1}(u_i - u_{i-1}) = y_i(u_i - u_i) \, (i = 2, 3, \ldots, n-1) \\ z_{i-1}(u_i - u_{i-1}) = z_i(u_i - u_i) \end{cases} \quad (2.5)$$

$$\begin{cases} \dot{x}_{i-1}(u_i - u_{i-1}) = \dot{x}_i(u_i - u_i) \\ \dot{y}_{i-1}(u_i - u_{i-1}) = \dot{y}_i(u_i - u_i) \, (i = 2, 3, \ldots, n-1); \\ \dot{z}_{i-1}(u_i - u_{i-1}) = \dot{z}_i(u_i - u_i) \end{cases}$$

$$\begin{cases} \ddot{x}_{i-1}(u_i - u_{i-1}) = \ddot{x}_i(u_i - u_i) \\ \ddot{y}_{i-1}(u_i - u_{i-1}) = \ddot{y}_i(u_i - u_i) \, (i = 2, 3, \ldots, n-1) \\ \ddot{z}_{i-1}(u_i - u_{i-1}) = \ddot{z}_i(u_i - u_i) \end{cases}$$

step 2.34, obtaining undetermined coefficients corresponding to an analytical formula of the composition curve l of the minimum repeating unit by combining the formulas 2.4 and 2.5, and thereby to obtain the minimum repeating unit curve $P_{00}$ of the minimum repeating unit.

In an embodiment, in the step 3, the performing vector superposition on the minimum repeating unit curve to obtain an organization structure curve p of the organization structure of the wire mesh specifically includes:

assuming, based on a superposition principle of the wire mesh and the minimum repeating unit curve $P_{00}$ obtained in the step 2, that a spacing in a direction x between the minimum repeating unit curve $P_{00}$ and a minimum repeating unit curve $P_{10}$ adjacent to the minimum repeating unit curve $P_{00}$ in the direction x is $R_x$, a spacing in a direction y between the minimum repeating unit curve $P_{00}$ and a minimum repeating unit curve $P_{01}$ adjacent to the minimum repeating unit curve $P_{00}$ in the direction y is $R_y$; obtaining a minimum repeating unit curve $P_{ij}$ of the organization structure with a difference of i unit in the direction x from the minimum repeating unit curve $P_{00}$ and a difference of j unit in the direction y from the minimum repeating unit curve $P_{00}$, by translating the minimum repeating unit curve $P_{00}$ by $iR_x$ in the direction x, and then translating the minimum repeating unit curve $P_{00}$ by $jR_y$ in the direction y; and expressing the organization structure curve P of the organization structure of the wire mesh in a formula 3.1:

$$P\{P_{ij}\}, i \in Z, j \in Z, 0 \leq i \leq a, 0 \leq j \leq c \quad (3.1),$$

where a represents a maximum number of minimum repeating unit curves of the organization structure of the wire mesh in the direction x, and c represents a maximum number of minimum repeating unit curves of the organization structure of the wire mesh in the direction y.

In an embodiment, the step 4 specifically includes step 4.1, assuming that a left boundary of the electromagnetic analysis periodic unit of the wire mesh is $X_1$ and a lower boundary of the electromagnetic analysis periodic unit of the wire mesh is $y_1$, and determining a right boundary $X_2$ of the electromagnetic analysis periodic unit and an upper boundary $y_2$ of the electromagnetic analysis periodic unit by formulas 4.1 and 4.2:

$$X_2 = X_1 + R_x \quad (4.1),$$

$$y_2=Y_1+R_y \quad (4.2);$$

step 4.2, discretizing the organization structure curve P of the organization structure of the wire mesh to obtain a coordinate point node for describing the organization structure of the wire mesh, and determining, based on the coordinate point node, the coordinate point elec_node of the electromagnetic analysis periodic unit of the wire mesh by a formula 4.3:

$$\text{elec\_node}=\text{node}(x_1<x_i<x_2, y_1<y_i<y_2) \quad (4.3).$$

In an embodiment, the step 5 specifically includes:

step 5.1, using a periodic structure analysis module in a Computer Simulation Technology (CST) microwave studio; and based on the coordinate point elec_node of the electromagnetic analysis periodic unit of the wire mesh, using a command of three dimensional (3D) spline in a software to generate an electromagnetic analysis periodic unit curve of the electromagnetic analysis periodic unit of the wire mesh;

step 5.2, converting, based on a wire diameter d and a wire material in the step 1, the electromagnetic analysis periodic unit curve of the wire mesh into the solid model of the electromagnetic analysis periodic unit of the wire mesh through a command of Bond wire1; and step 5.3, setting boundary conditions, including: setting the boundary condition for each of X and Y directions as "unit cell", and setting the boundary condition for a Z direction as "and open space"; setting a working frequency and an incident angle of an electromagnetic wave, and determining a frequency domain solver for solving to thereby obtain the reflection coefficient S11 and the transmission coefficient S21 of the wire mesh.

In an embodiment, the step 6 specifically includes:

step 6.1, based on the coordinate point node for describing the organization structure of the wire mesh described in the step 4, using an ANSYS software to: use a beam element of Beam188 to simulate the wire mesh, define a shape and a size of a section of the beam element, and establish a finite element model of the wire mesh by using a BSPLIN command, set a contact type of the wire mesh as adhesive contact, apply a boundary condition and a load to the wire mesh and perform static analysis on the wire mesh, to thereby obtain a coordinate point deformmtion_node for describing an organization structure of the wire mesh after deformation; and step 6.2, repeating the steps 4 and 5 based on the coordinate point deformmtion_node for describing an organization structure of the wire mesh after deformation obtained in the step 6.1, to obtain a solid model of an electromagnetic analysis periodic unit of the wire mesh after deformation, and the reflection coefficient S11 and the transmission coefficient S21 of the wire mesh after deformation.

The disclosure has at least the following beneficial effects.

(1) The analysis method for transmission and reflection coefficients of the wire mesh of the mesh antenna of the disclosure uses an accurate wire mesh model to perform electromagnetic analysis; compared with the existing analysis method using a wire mesh equivalent model, the calculation of the analysis method of the disclosure is more accurate, thereby making up the blank that a wire mesh analysis cannot be directly performed by using an electromagnetic analysis software.

(2) The analysis method for transmission and reflection coefficients of the wire mesh of the mesh antenna of the disclosure can not only calculate the transmission and reflection coefficients of the wire mesh in a normal state, but also can calculate the transmission and reflection coefficients of the wire mesh in a loaded state, and calculation results are closer to an actual work condition.

Figure 1:
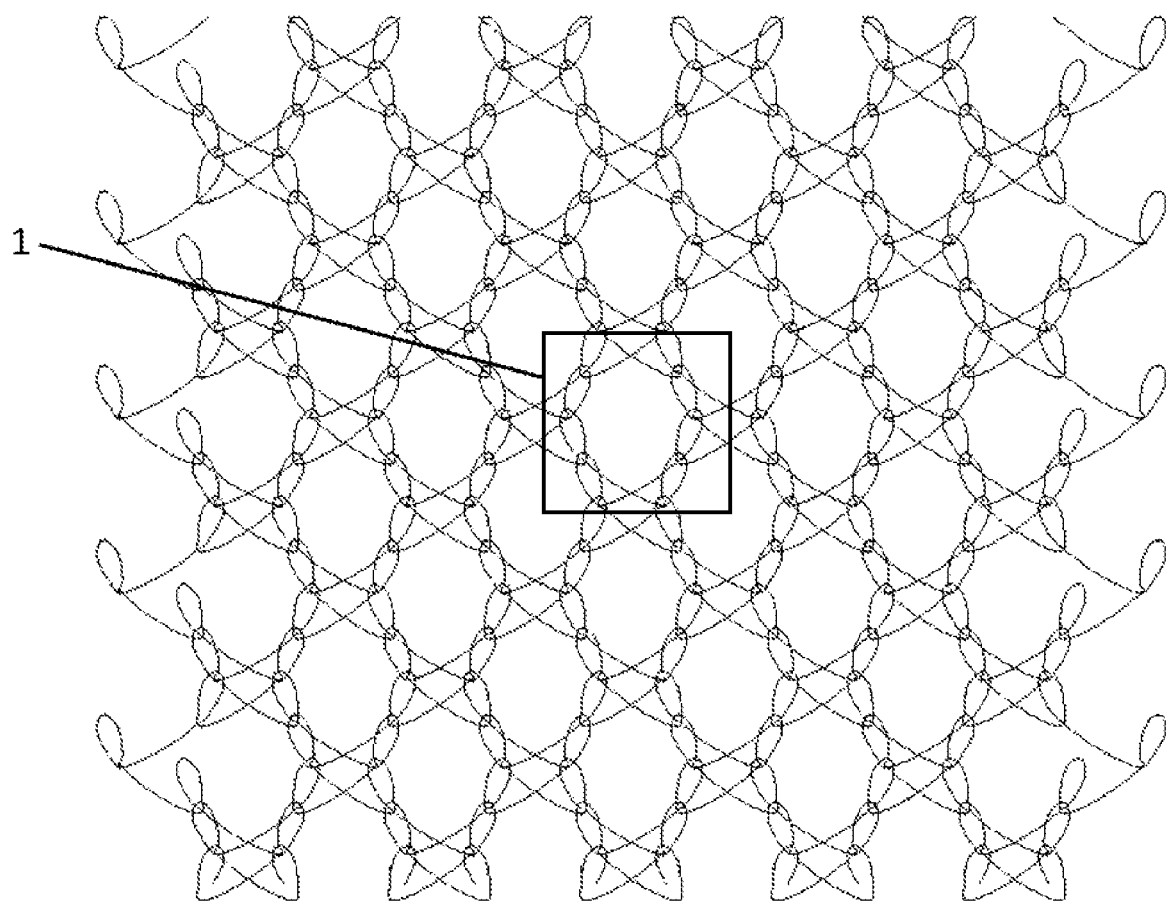
FIG. 1 illustrates a schematic structural view of a double-comb closed warp satin weave wire mesh to which an analysis method for transmission and reflection coefficients of a wire mesh of a mesh antenna is applied according to an embodiment of the disclosure.

Reference numerals: 1—Electromagnetic analysis periodic unit curve; 2—Inclined coil; 3—Inclined coil; 4—Inclined coil; 5—Inclined coil.

DETAILED DESCRIPTION OF EMBODIMENTS

The disclosure will be described in detail in combination with to the accompanying drawings and specific embodiments.

An embodiment of the disclosure provides an analysis method for transmission and reflection coefficients of a wire mesh of a mesh antenna. The analysis method includes steps 1-6.

In the step 1, model parameters and simulation parameters of the wire mesh are input into an analysis system.

The model parameters and the simulation parameters of the wire mesh are provided by users. The model parameters include: an organization structure P of the wire mesh, a coil height b of the wire mesh, a row-column spacing w of the wire mesh, a wire diameter d, and a coil inclination angle α of the wire mesh. The simulation parameters include: a wire material, a load on the wire mesh, a Poisson ratio of the wire material, an elastic modulus of the wire material, a density of the wire material, a working frequency, an incident angle of an electromagnetic wave.

In the step 2, coordinate points of a minimum repeating unit of the wire mesh are obtained, and a minimum repeating unit curve $P_{00}$ of the minimum repeating unit is determined.

Figure 2:
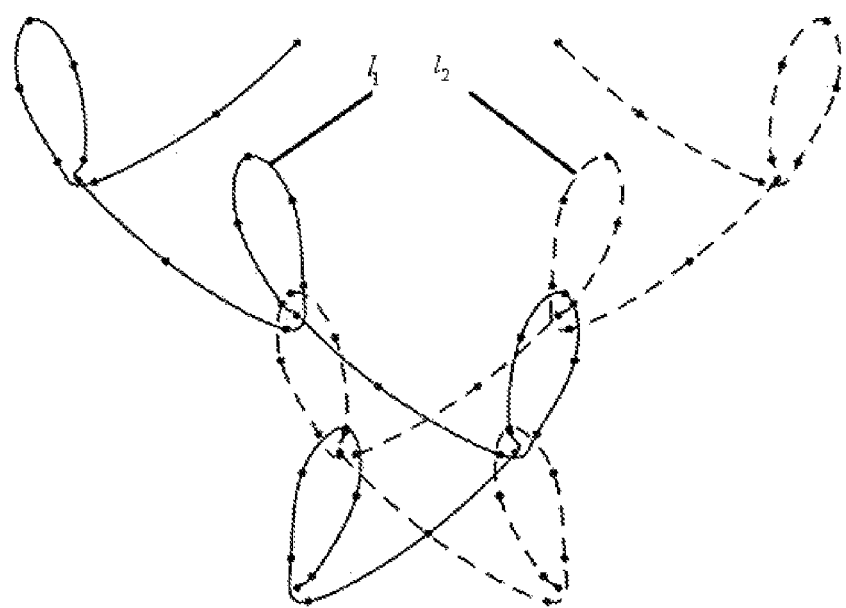
FIG. 2 illustrates a schematic view of a minimum repeating unit curve and coordinate points thereof of a minimum repeating unit of a double-comb closed warp satin weave wire mesh to which an analysis method for transmission and reflection coefficients of a wire mesh of a mesh antenna is applied according to an embodiment of the disclosure.
Figure 4:
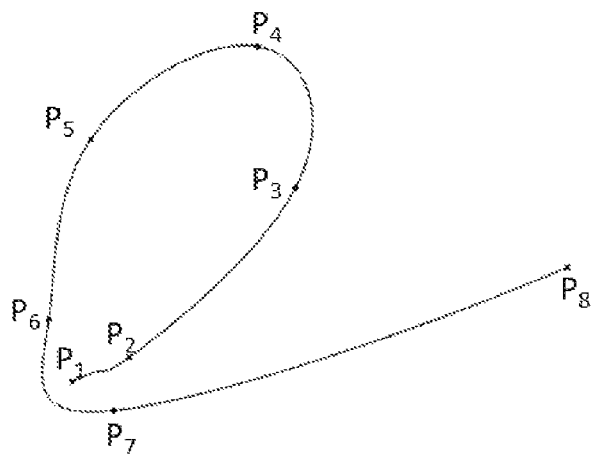
FIG. 4 illustrates a schematic view of a curve and coordinate points thereof of a single basic coil of a double-comb closed warp satin weave wire mesh to which an analysis method for transmission and reflection coefficients of a wire mesh of a mesh antenna is applied according to an embodiment of the disclosure.
Figure 5:
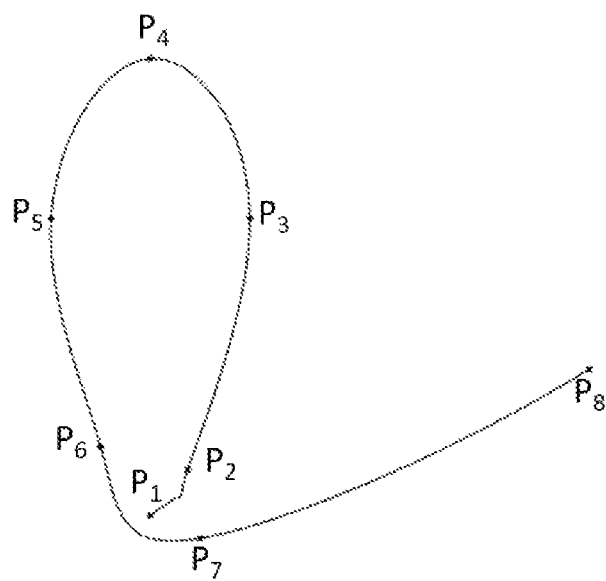
FIG. 5 illustrates a schematic view of a curve and coordinate points thereof of a single inclined coil of a double-comb closed warp satin weave wire mesh to which an analysis method for transmission and reflection coefficients of a wire mesh of a mesh antenna is applied according to an embodiment of the disclosure.

Taking a double-comb closed warp satin weave wire mesh as an example, from a schematic structural view of the double-comb closed warp satin weave wire mesh shown in FIG. 1 and a minimum repeating unit curve and coordinate points thereof of a minimum repeating unit of the double-comb closed warp satin weave wire mesh shown in FIG. 2, it can be known that the wire mesh is formed through vector superposition of minimum repeating units in horizontal and vertical directions. From a composition curve i and coordinate points thereof of the minimum repeating unit of the double-comb closed warp satin weave wire mesh shown in FIG. 3 and a curve and coordinate points thereof of a single basic coil of the double-comb closed warp satin weave wire mesh shown in FIG. 4, it can be known that the minimum repeating unit is formed by expanding inclined coils, and a topological relationship of the inclined coils is determined by the organization structure of the wire mesh. The single inclined coil is obtained by adjusting a single basic coil according to an actual inclination situation. A curve and coordinate points thereof of the single inclined coil of the double-comb closed warp satin weave wire mesh are shown in FIG. 5. Therefore, in order to analyze the transmission and reflection coefficients of the wire mesh, it is necessary to establish an accurate wire mesh model, and in order to establish the wire mesh model, it is necessary to determine an accurate minimum repeating unit of the wire mesh. A process for determining the minimum repeating unit curve $P_{00}$ of the minimum repeating unit includes the following steps 2.1-2.3.

In the step 2.1, the coordinate points of the single inclined coil of the wire mesh are derived according to the model parameters in the step 1. Specifically, the step 2.1 includes steps 2.11 and 2.22.

In the step 2.11, according to the model parameters provided by the user in the step 1, a single coil of the wire mesh is described by using several key coordinate points obtained based on a computer simulation experiment in the related art "Three-dimensional model of warp knitted fabric based on non uniform rational B-spline (NURBS) curve" (Cong Honglian et al., Journal of Textile, 2008), and a coordinate point matrix A of a single basic coil is thereby obtained.

In the step 2.12, the coordinate point matrix A of the single basic coil is adjusted by using a rotation matrix $T_1$ through a formula 2.1 to thereby obtain the coordinate points $A_1$ of the single inclined coil:

$$A_1 = A \cdot T_1 \quad (2.1).$$

The rotation matrix T is expressed in a formula 2.2:

$$T_1 = \begin{bmatrix} \cos\alpha & -\sin\alpha & 0 \\ \sin\alpha & \cos\alpha & 0 \\ 0 & 0 & 1 \end{bmatrix} \quad (2.2)$$

where α represents the coil inclination angle of the wire mesh.

In the step 2.2, according to the coordinate points $A_1$ of the single inclined coil obtained in the step 2.1 and the organization structure P of the wire mesh provided in the step 1, the coordinate points of the minimum repeating unit of the wire mesh is obtained, which specifically includes the following steps 2.21 and 2.22.

In the step 2.21, a topological relationship between the minimum repeating unit and the single inclined coil is determined according to the organization structure P of the wire mesh.

In the step 2.22, according to the coordinate points $A_1$ of the single inclined coil obtained in the step 2.1 and the topological relationship obtained in the step 2.21, the coordinate points of the minimum repeating unit of the wire mesh are obtained.

In the step 2.3, the curve minimum repeating unit $P_{00}$ of the minimum repeating unit is solved according to the coordinate points of the minimum repeating unit obtained in the step 2.2. The minimum repeating unit curve $P_{00}$ of the minimum repeating unit in the disclosure is obtained by performing interpolating on the coordinate points of the minimum repeating unit obtained in the step 2.2 by using a periodic cubic spline curve, which specifically includes the following steps 2.31 to 2.34:

step 2.31, determining an incremental sequence, in which, $u_1 < u_2 < \ldots u_n$, and $\Delta u = u_{i+1} - u_i = 1$, (i=1, 2, ..., n−1), and expressing n−1 sub-curves of each composition curve 1 described by n coordinate points of the minimum repeating unit of the wire mesh as $s_i(u-u_i)$, where i=1, 2, ..., n−1, and $u \in [u_i, u_{i+1}]$, $s_i(u-u_i)$ is expressed in a formula 2.3:

$$s_i(u-u_i) = \begin{cases} x_i(u-u_i) = a_{ix} + b_{ix}(u-u_i) + c_{ix}(u-u_i)^2 + d_{ix}(u-u_i)^3 \\ y_i(u-u_i) = a_{iy} + b_{iy}(u-u_i) + c_{iy}(u-u_i)^2 + d_{iy}(u-u_i)^3 \\ z_i(u-u_i) = a_{iz} + b_{iz}(u-u_i) + c_{iz}(u-u_i)^2 + d_{iz}(u-u_i)^3 \end{cases} i \in (1, 2, \ldots, n-1), \quad (2.3)$$

where $a_{ix}$, $b_{ix}$, $c_{ix}$, $d_{ix}$, $a_{iy}$, $b_{iy}$, $c_{iy}$, $d_{iy}$, $a_{iz}$, $b_{iz}$, $c_{iz}$, $d_{iz}$ represent undetermined coefficients corresponding to an analytic formula of an i-th sub-curve of the n−1 sub-curves, respectively, and i=1, 2, . . . , n−1;

step 2.32, based on that first derivatives of first and last endpoints of the composition curve 1 are equal, and second derivatives of first and last endpoints of the composition curve 1 are equal, determining a formula 2.4:

$$\begin{cases} \dot{x}_1(u_1 + 0 - u_1) = \dot{x}_{n-1}(u_n - 0 - u_{n-1}) \\ \dot{y}_1(u_1 + 0 - u_1) = \dot{y}_{n-1}(u_n - 0 - u_{n-1}) \\ \dot{z}_1(u_1 + 0 - u_1) = \dot{z}_{n-1}(u_n - 0 - u_{n-1}) \end{cases}; \quad (2.4)$$
$$\begin{cases} \ddot{x}_1(u_1 + 0 - u_1) = \ddot{x}_{n-1}(u_n - 0 - u_{n-1}) \\ \ddot{y}_1(u_1 + 0 - u_1) = \ddot{y}_{n-1}(u_n - 0 - u_{n-1}) \\ \ddot{z}_1(u_1 + 0 - u_1) = \ddot{z}_{n-1}(u_n - 0 - u_{n-1}) \end{cases}$$

step 2.33, based on that a function value of each of coordinate points excepting for endpoints of the composition curve 1 on the i-th sub-curve is equal to a function value of each of coordinate points excepting for the endpoints of the composition curve 1 on an i+1-th curve of the n−1 sub-curves, a first derivative of each of coordinate points excepting for the endpoints of the composition curve 1 on the i-th sub-curve is equal to a first derivative of each of coordinate points excepting for the endpoints of the composition curve 1 on the i+1-th curve of the n−1 sub-curves, and a second derivative of each of coordinate points excepting for the endpoints of the composition curve 1 on the i-th sub-curve is equal to a second derivative of each of coordinate points excepting for the endpoints of the composition curve 1 on the i+1-th curve of the n−1 sub-curves, determining a formula 2.5:

$$\begin{cases} x_{i-1}(u_i - u_{i-1}) = x_i(u_i - u_i) \\ y_{i-1}(u_i - u_{i-1}) = y_i(u_i - u_i) \, (i=2, 3, \ldots, n-1) \\ z_{i-1}(u_i - u_{i-1}) = z_i(u_i - u_i) \end{cases} \quad (2.5)$$
$$\begin{cases} \dot{x}_{i-1}(u_i - u_{i-1}) = \dot{x}_i(u_i - u_i) \\ \dot{y}_{i-1}(u_i - u_{i-1}) = \dot{y}_i(u_i - u_i) \, (i=2, 3, \ldots, n-1); \\ \dot{z}_{i-1}(u_i - u_{i-1}) = \dot{z}_i(u_i - u_i) \end{cases}$$
$$\begin{cases} \ddot{x}_{i-1}(u_i - u_{i-1}) = \ddot{x}_i(u_i - u_i) \\ \ddot{y}_{i-1}(u_i - u_{i-1}) = \ddot{y}_i(u_i - u_i) \, (i=2, 3, \ldots, n-1) \\ \ddot{z}_{i-1}(u_i - u_{i-1}) = \ddot{z}_i(u_i - u_i) \end{cases}$$

step 2.34, obtaining undetermined coefficients corresponding to an analytical formula of the composition curve 1 of the minimum repeating unit by combining the formulas 2.4 and 2.5, and thereby to obtain the minimum repeating unit curve $P_{00}$ of the minimum repeating unit.

In the step 3, vector superposition is performed on the minimum repeating unit curve $P_{00}$ obtained in the step 2 to obtain an organization structure curve P of the organization structure of the wire mesh.

Figure 6:
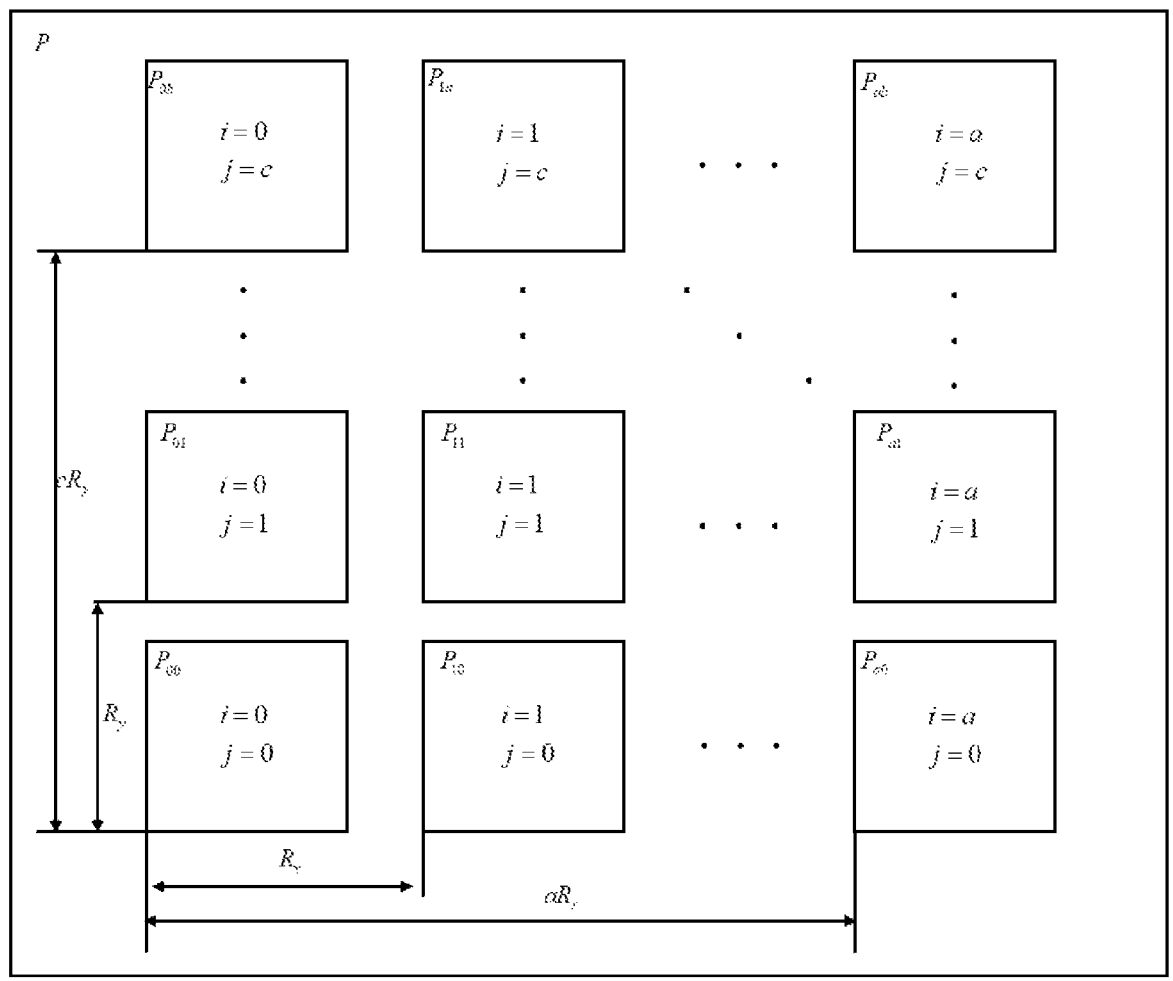
FIG. 6 illustrates a superimposing schematic diagram of a wire mesh to which an analysis method for transmission and reflection coefficients of a wire mesh of a mesh antenna is applied according to an embodiment of the disclosure.
Figure 7:
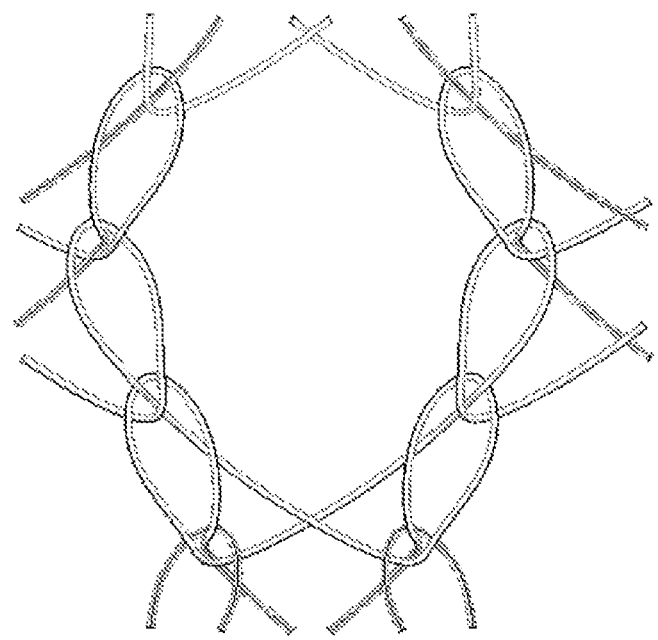
FIG. 7 illustrates a solid model of an electromagnetic analysis periodic unit of a double-comb closed warp satin weave wire mesh before deformation according to an embodiment 1 of the disclosure.

As can be seen from the superimposing schematic diagram of the wire mesh shown in FIG. 6, the organization structure P of the wire mesh can be formed by overlapping the minimum repeating units in horizontal and vertical directions. Based on the curve $P_{00}$ of the minimum repeating unit obtained in the step 2, it is assumed that a spacing in a direction x between the minimum repeating unit curve $P_{00}$ and a minimum repeating unit curve $P_{10}$ adjacent to the minimum repeating unit curve $P_{00}$ in the direction x is $R_x$, a spacing in a direction y between the minimum repeating unit curve $P_{00}$ and a minimum repeating unit curve Poi adjacent to the minimum repeating unit curve $P_{00}$ in the direction y is $R_y$, then, a minimum repeating unit curve $P_{ij}$ of the organization structure P of the wire mesh, which is different from the minimum repeating unit curve $P_{00}$ by i unit in the direction x and different from the minimum repeating unit curve $P_{00}$ by j unit in the direction y, can be obtained by translating the minimum repeating unit curve $P_{00}$ by $iR_x$ in the direction x, and then translating the minimum repeating unit curve $P_{00}$ by $iR_y$ in the direction y. The organization structure curve P of the organization structure of the wire mesh is expressed in a formula 3.1:

$$P\{P_{ij}\}, i \in Z, j \in Z, 0 \leq i \leq a, 0 \leq j \leq c \quad (3.1).$$

In the formula 3.1, a represents a maximum number of minimum repeating unit curves of the organization structure of the wire mesh in the direction x, and c represents a maximum number of minimum repeating unit curves of the organization structure of the wire mesh in the direction y.

In the step 4, the organization structure curve P of the organization structure of the wire mesh obtained in the step 3 is discretized, to extract a coordinate point elec_node of an electromagnetic analysis periodic unit of the wire mesh.

The wire mesh is a typical periodic unit, and it can be analyzed only by establishing its electromagnetic analysis periodic unit. The specific analysis process includes the following steps 4.1 and 4.2.

In the step 4.1, it is assumed that a left boundary of the electromagnetic analysis periodic unit of the wire mesh is $X_1$ and a lower boundary of the electromagnetic analysis periodic unit of the wire mesh is $y_1$, then a right boundary $X_2$ of the electromagnetic analysis periodic unit and an upper boundary $y_2$ of the electromagnetic analysis periodic unit are determined by formulas 4.1 and 4.2:

$$X_2 = X_1 + R_x \quad (4.1),$$

$$y_2 = y_1 + R_y \quad (4.2).$$

In the step 4.2, the coordinate point elec_node of the electromagnetic analysis periodic unit of the wire mesh is obtained.

In order to establish the electromagnetic analysis periodic unit of the wire mesh in a Computer Simulation Technology (CST) microwave studio, it is necessary to discretize the organization structure curve P of the organization structure of the wire mesh obtained in step 3, because organization structure curve P of the organization structure of the wire mesh is formed by the superposition of the minimum repeating unit curve $P_{00}$, and the minimum repeating unit curve $P_{00}$ are composed of several composition curves, and the discretization method of each composition curve is the same. A discrete process of any composition curve 1 is as follows: a corresponding analytical formula of any composition curve l is $s_i(u-u_i)(i=1, 2, \ldots, n-1)$, and discrete points of the composition curve 1 can be obtained by taking any $u \in [u_i, u_{i+1}]$. A coordinate point node of the organization structure of the wire mesh can be obtained by discretizing all the composition curves, and the coordinate point elec_node of the electromagnetic analysis periodic unit of the wire mesh can be expressed by a formula 4.3:

$$\text{elec\_node} = \text{node}(x_1 < x_i < x_2, y_1 < y_i < y_2) \quad (4.3).$$

In the step 5, based on the coordinate point elec_node of the electromagnetic analysis periodic unit of the wire mesh obtained in the step 4, a solid model of the electromagnetic analysis periodic unit of the wire mesh is established, and a reflection coefficient S11 and a transmission coefficient S21 of the wire mesh by analyzing the solid model are obtained. The step 5 specifically incudes:

step 5.1, using a periodic structure analysis module in a Computer Simulation Technology (CST) microwave studio; and based on the coordinate point elec_node of the electromagnetic analysis periodic unit of the wire mesh, using a command of three dimensional (3D) spline in a software to generate an electromagnetic analysis periodic unit curve of the electromagnetic analysis periodic unit 1 of the wire mesh;

step 5.2, converting, based on a wire diameter d and a wire material in the step 1, the electromagnetic analysis periodic unit curve of the wire mesh into the solid model of the electromagnetic analysis periodic unit 1 of the wire mesh through a command of Bond wire1; and step 5.3, setting boundary conditions, including: setting the boundary condition for each of X and Y directions as "unit cell", and setting the boundary condition for a Z direction as "and open space"; setting a working frequency and an incident angle of an electromagnetic wave, and determining a frequency domain solver for solving to thereby obtain the reflection coefficient S11 and the transmission coefficient S21 of the wire mesh.

In the step 6, a reflection coefficient S11 and a transmission coefficient S21 of the wire mesh after deformation are determined. The step 6 specifically includes:

step 6.1, based on the coordinate point node for describing the organization structure of the wire mesh described in the step 4, using an ANSYS software to: use a beam element of Beam188 to simulate the wire mesh, define a shape and a size of a section of the beam element, and establish a finite element model of the wire mesh by using a BSPLIN command, set a contact type of the wire mesh as adhesive contact, apply a boundary condition and a load to the wire mesh and perform static analysis on the wire mesh, to thereby obtain a coordinate point deformtion_node for describing an organization structure of the wire mesh after deformation; and step 6.2, repeating the steps 4 and 5 based on the coordinate point deformtion_node for describing an organization structure of the wire mesh after deformation obtained in the step 6.1, to obtain a solid model of an electromagnetic analysis periodic unit of the wire mesh after deformation, and the reflection coefficient S11 and the transmission coefficient S21 of the wire mesh after deformation.

Embodiment 1

Wire meshes can be divided into different weave structures according to different topological relations of coils, in which the double-comb closed warp satin weave is a common weave of wire mesh, and its structure is shown in FIG. 1. Transmission and reflection coefficients of the double-comb closed warp satin weave wire mesh are analyzed by the above analysis method, which specifically includes the following steps 1-6.

In the step 1, model parameters and simulation parameters of the wire mesh are input into an analysis system.

The model parameters and the simulation parameters of the wire mesh are provided by users. The model parameters include: an organization structure P of the wire mesh, a coil height b of the wire mesh, a row-column spacing w of the wire mesh, a wire diameter d, and a coil inclination angle α of the wire mesh. The simulation parameters include: a wire material, a load on the wire mesh, a Poisson ratio of the wire material, an elastic modulus of the wire material, a density of the wire material, a working frequency, an incident angle of an electromagnetic wave.

In the step 2, coordinate points of a minimum repeating unit of the wire mesh are obtained, and a minimum repeating unit curve $P_{00}$ of the minimum repeating unit is determined.

Figure 3:
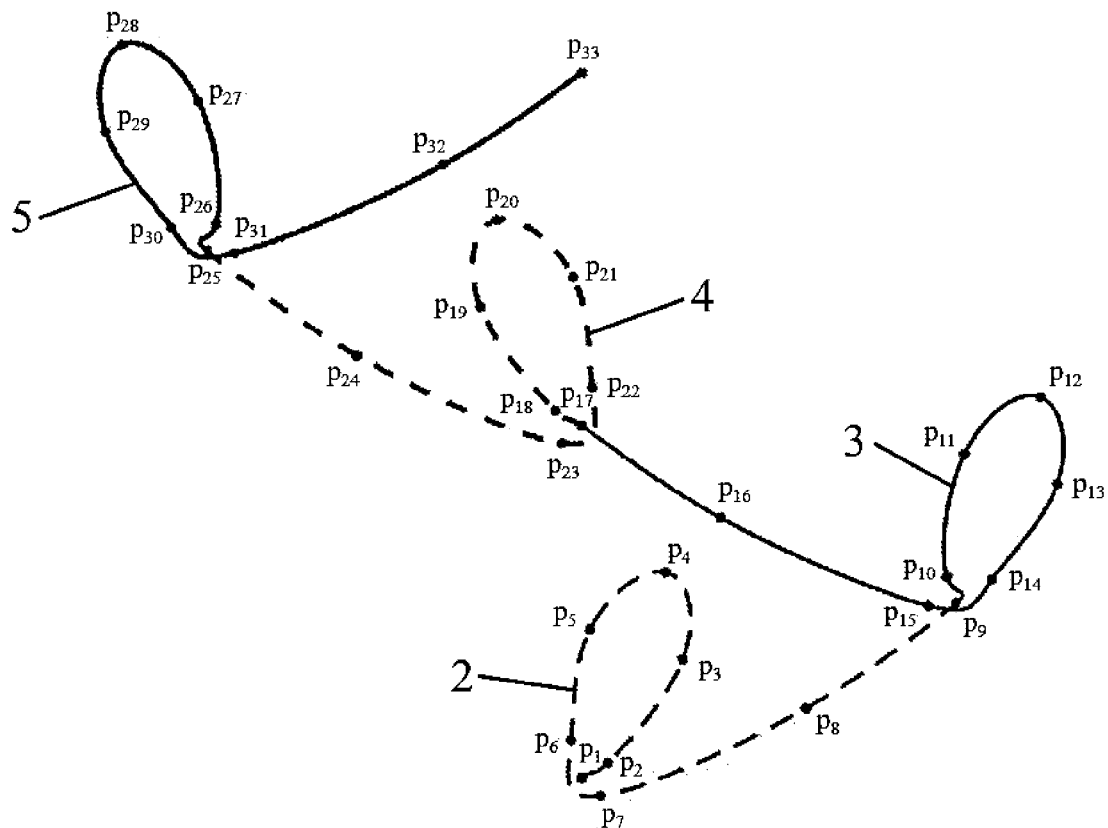
FIG. 3 illustrates a schematic view of a composition curve i and coordinate points thereof of the minimum repeating unit of the double-comb closed warp satin weave wire mesh to which the analysis method for transmission and reflection coefficients of the wire mesh of the mesh antenna is applied according to an embodiment of the disclosure.

A schematic structural view of the double-comb closed warp satin weave wire mesh is shown in FIG. 1; and a minimum repeating unit curve and coordinate points thereof of a minimum repeating unit of the double-comb closed warp satin weave wire mesh are shown in FIG. 2. From FIG. 1 and FIG. 2, it can be known that the double-comb closed warp satin weave wire mesh is formed through vector superposition of minimum repeating units in horizontal and vertical directions. The minimum repeating unit curve of the double-comb closed warp satin weave wire mesh is composed of two axisymmetric composition curves $l_1$ and $l_2$. The composition curve $l_1$ of the minimum repeating unit and coordinate points thereof are shown in FIG. 3. Combined with a curve and coordinate points thereof of a single basic coil of the double-comb closed warp satin weave wire mesh shown in FIG. 4 and a curve and coordinate points thereof of a single inclined coil of the double-comb closed warp satin weave wire mesh are shown in FIG. 5, it can be seen that the composition curve $l_1$ consists of an inclined coil 2, an inclined coil 3, an inclined coil 4, and an inclined coil 5 obtained by adjusting the basic coil. Coordinate points $(p_9\sim p_{16})$ of the inclined coil 3 are obtained by translating coordinate points $(p_1\sim p_8)$ after mirroring about a Y-axis of the inclined coil 2 by nw along an X-axis and then by 0.87b along the Y-axis. The coordinate points $(p_{17}\sim p_{32})$ of the inclined coil 3 and the inclined coil 4 are obtained by translating the coordinate points after mirroring about the Y-axis of the inclined coil 2 and coordinate points after mirroring about the Y-axis of the inclined coil 3 $(p_9\sim p_{16})$ by 1.74b along the Y-axis. In order to ensure the continuity between the minimum repeating unit and a longitudinally adjacent minimum repeating unit, the coordinate point $p_1$ are translated by 3.48b along the X-axis to obtain a final coordinate point $p_{33}$ of the curve $l_1$. This coordinate point $p_{33}$ is also a starting point, i.e., a first coordinate point of the longitudinally adjacent minimum repeating unit. Coordinate points of the composition curve $l_2$ can be obtained by translating the coordinate points of the composition curve $l_1$ after being symmetrical about the Y axis along the X axis by nw. Therefore, in order to analyze the transmission and reflection coefficients of wire mesh, it is necessary to establish an accurate wire mesh model, and to establish the wire mesh model, it is necessary to determine the accurate minimum repeating unit of wire mesh. The method for determining the minimum repeating unit curve $P_{00}$ of the minimum repeating unit specifically includes the following steps 2.1-2.3.

In the step 2.1, coordinate points $A_1$ of a single inclined coil of the wire mesh are derived according to the model parameters in the step 1. The step 2.1 specifically includes steps 2.1, 2.2, and 2.3.

In the step 2.11, according to the model parameters provided by the user in the step 1, a single coil of the wire mesh is described by using 8 key coordinate points (as shown in FIG. 5) obtained based on a computer simulation experiment in the related art "Three-dimensional model of warp knitted fabric based on non uniform rational B-spline (NURBS) curve" (Cong Honglian et al., Journal of Textile, 2008), and a coordinate point matrix A of a single basic coil is thereby obtained. The coordinate point matrix A is expressed in a formula 2.6, and each row represents coordinate values of each key coordinate point:

$$A = \begin{bmatrix} 0 & 0 & 0.5d \\ 0.2b & 0.65b & 1.54d \\ 0 & b & 0.5d \\ -0.2b & 0.65b & 1.54d \\ -d & 0.15b & 0.5d \\ 0.1b & -0.15b & 0.5d \\ 0.4nw & 0.35b & -2d \\ nw & 0.85b & 0.5d \end{bmatrix}, \quad (2.6)$$

where b represents the coil height of the wire mesh, w represents the row-column spacing of the wire mesh, d represents the wire diameter, and n represents a total number of overlap needles on a needle back, which is related to the organization structure P of the wire mesh, and n=1.

In the step 2.12, the coordinate point matrix A of the single basic coil is adjusted by using a rotation matrix $T_1$ through a formula 2.2 to thereby obtain the coordinate points $A_1$ of the single inclined coil:

$$A_1 = A \cdot T_1 \quad (2.2).$$

The rotation matrix $T_1$ is expressed in a formula 2.3:

$$T_1 = \begin{bmatrix} \cos\alpha & -\sin\alpha & 0 \\ \sin\alpha & \cos\alpha & 0 \\ 0 & 0 & 1 \end{bmatrix} \quad (2.3)$$

where $\alpha$ represents the coil inclination angle of the wire mesh.

In the step 2.2, according to the coordinate points $A_1$ of the single inclined coil obtained in the step 2.1 and the organization structure P of the wire mesh provided in the step 1, the coordinate points of the minimum repeating unit of the wire mesh is obtained, which specifically includes the following steps 2.21 and 2.22.

In the step 2.21, a topological relationship between the minimum repeating unit and the single inclined coil is determined according to the organization structure P of the wire mesh.

In the step 2.22, according to the coordinate points $A_1$ of the single inclined coil obtained in the step 2.1 and the topological relationship obtained in the step 2.21, the coordinate points of the minimum repeating unit of the wire mesh are obtained.

In the step 2.3, the curve minimum repeating unit $P_{00}$ of the minimum repeating unit of the wire mesh is solved according to the coordinate points of the minimum repeating unit obtained in the step 2.2. The minimum repeating unit curve $P_{00}$ of the minimum repeating unit of the wire mesh in the disclosure is obtained by performing interpolating on the coordinate points of the minimum repeating unit obtained in the step 2.2 by using a periodic cubic spline curve, which specifically includes the following steps 2.31 to 2.34:

step 2.31, determining an incremental sequence, in which, $u_1 < u_2 < \ldots u_{33}$, and $\Delta u = u_{i+1} - u_i = 1$, (i=1, 2, . . . , 32), and expressing 33 sub-curves of each composition curve $l_1$ described by 33 key coordinate points of the minimum repeating unit of the wire mesh as $s_i(u-u_i)$, where i=1, 2, . . . , 32, and $u \in [u_i, u_{i+1}]$ $s_i(u-u_i)$ is expressed in a formula 2.7:

$$s_i(u-u_i) = \begin{cases} x_i(u-u_i) = a_{ix} + b_{ix}(u-u_i) + c_{ix}(u-u_i)^2 + d_{ix}(u-u_i)^3 \\ y_i(u-u_i) = a_{iy} + b_{iy}(u-u_i) + c_{iy}(u-u_i)^2 + d_{iy}(u-u_i)^3 \; i \in (1, 2, \ldots, 32), \\ z_i(u-u_i) = a_{iz} + b_{iz}(u-u_i) + c_{iz}(u-u_i)^2 + d_{iz}(u-u_i)^3 \end{cases} \quad (2.7)$$

where $a_{ix}$, $b_{ix}$, $c_{ix}$, $d_{ix}$, $a_{iy}$, $b_{iy}$, $c_{iy}$, $d_{iy}$, $a_{iz}$, $b_{iz}$, $c_{iz}$, $d_{iz}$ represent undetermined coefficients corresponding to an analytic formula of an i-th sub-curve of the n−1 sub-curves, respectively, and i=1, 2, . . . , 32;

step 2.32, based on that first derivatives of first and last endpoints of the composition curve $l_1$ are equal, and second derivatives of first and last endpoints of the composition curve $l_1$ are equal, determining a formula 2.8:

$$\begin{cases} \dot{x}_1(u_1 + 0 - u_1) = \dot{x}_{32}(u_{33} - 0 - u_{32}) \\ \dot{y}_1(u_1 + 0 - u_1) = \dot{y}_{32}(u_{33} - 0 - u_{32}) \\ \dot{z}_1(u_1 + 0 - u_1) = \dot{z}_{32}(u_{33} - 0 - u_{32}) \\ \ddot{x}_1(u_1 + 0 - u_1) = \ddot{x}_{32}(u_{33} - 0 - u_{32}) \\ \ddot{y}_1(u_1 + 0 - u_1) = \ddot{y}_{32}(u_{33} - 0 - u_{32}) \\ \ddot{z}_1(u_1 + 0 - u_1) = \ddot{z}_{32}(u_{33} - 0 - u_{32}) \end{cases} \quad (2.8)$$

step 2.33, based on that a function value of each of coordinate points excepting for endpoints of the composition curve $l_1$ on the i-th sub-curve is equal to a function value of each of coordinate points excepting for the endpoints of the composition curve $l_1$ on an i+1-th curve of the n−1 sub-curves, a first derivative of each of coordinate points excepting for the endpoints of the composition curve $l_1$ on the i-th sub-curve is equal to a first derivative of each of coordinate points excepting for the endpoints of the composition curve $l_1$ on the i+1-th curve of the n−1 sub-curves, and a second derivative of each of coordinate points excepting for the endpoints of the composition curve $l_1$ on the i-th sub-curve is equal to a second derivative of each of coordinate points excepting for the endpoints of the composition curve $l_1$ on the i+1-th curve of the n−1 sub-curves, determining a formula 2.9:

$$\begin{cases} x_{i-1}(u_i - u_{i-1}) = x_i(u_i - u_i) \\ y_{i-1}(u_i - u_{i-1}) = y_i(u_i - u_i) \, (i = 2, 3, \ldots, 32) \\ z_{i-1}(u_i - u_{i-1}) = z_i(u_i - u_i) \\ \dot{x}_{i-1}(u_i - u_{i-1}) = \dot{x}_i(u_i - u_i) \\ \dot{y}_{i-1}(u_i - u_{i-1}) = \dot{y}_i(u_i - u_i) \, (i = 2, 3, \ldots, 32); \\ \dot{z}_{i-1}(u_i - u_{i-1}) = \dot{z}_i(u_i - u_i) \\ \ddot{x}_{i-1}(u_i - u_{i-1}) = \ddot{x}_i(u_i - u_i) \\ \ddot{y}_{i-1}(u_i - u_{i-1}) = \ddot{y}_i(u_i - u_i) \, (i = 2, 3, \ldots, 32) \\ \ddot{z}_{i-1}(u_i - u_{i-1}) = \ddot{z}_i(u_i - u_i) \end{cases} \quad (2.9)$$

step 2.34, obtaining undetermined coefficients corresponding to an analytical formula of the composition curve $l_1$ of the minimum repeating unit by combining the formulas 2.8 and 2.9, and thereby to obtain the minimum repeating unit curve $P_{00}$ of the minimum repeating unit.

In this embodiment 1, the wire diameter d is 0.05 mm, the coil height b of the wire mesh is 1.2 mm, the row-column spacing w of the wire mesh is 3.63 mm, and the coil inclination angle $\alpha$ is 20°, then the minimum repeating unit curve and its coordinate points of the double-comb closed warp satin weave wire mesh can be obtained as shown in FIG. 2.

In the step 3, vector superposition is performed on the minimum repeating unit curve $P_{00}$ obtained in the step 2 to obtain an organization structure curve P of the organization structure of the wire mesh.

As can be seen from the superimposing schematic diagram of the wire mesh shown in FIG. 6, the organization structure P of the wire mesh can be formed by overlapping the minimum repeating units in horizontal and vertical directions. Based on the curve $P_{00}$ of the minimum repeating unit obtained in the step 2, it is assumed that a spacing in a direction x between the minimum repeating unit curve $P_{00}$ and a minimum repeating unit curve $P_{10}$ adjacent to the minimum repeating unit curve $P_{00}$ in the direction x is $R_x$, a spacing in a direction y between the minimum repeating unit curve $P_{00}$ and a minimum repeating unit curve $P_{01}$ adjacent to the minimum repeating unit curve $P_{00}$ in the direction y is $R_y$, then, a minimum repeating unit curve $P_{ij}$ of the organization structure P of the wire mesh, which is different from the minimum repeating unit curve $P_{00}$ by i unit in the direction x and different from the minimum repeating unit curve $P_{00}$ by j unit in the direction y, can be obtained by translating the minimum repeating unit curve $P_{00}$ by $iR_x$ in the direction x, and then translating the minimum repeating unit curve $P_{00}$ by $iR_x$ in the direction y. The organization structure curve P of the organization structure of the wire mesh is expressed in a formula 3.1:

$$P\{P_{ij}\}, i \in Z, j \in Z, 0 \le i \le a, 0 \le j \le c \tag{3.1}$$

In the formula 3.1, a represents a maximum number of minimum repeating unit curves of the organization structure of the wire mesh in the direction x, and c represents a maximum number of minimum repeating unit curves of the organization structure of the wire mesh in the direction y.

In the embodiment 1, a=5, c=5, $R_x$=3.48b, $R_y$=2nw, and the schematic structural view of the double-comb closed warp satin weave wire mesh is finally obtained as shown in FIG. 1.

In the step 4, the organization structure curve P of the organization structure of the wire mesh obtained in the step 3 is discretized, to extract a coordinate point elec_node of an electromagnetic analysis periodic unit of the wire mesh.

The wire mesh is a typical periodic unit, and it can be analyzed only by establishing its electromagnetic analysis periodic unit. An electromagnetic analysis periodic unit curve I of the wire mesh in shown in FIG. 1. The specific analysis process includes the following steps 4.1 and 4.2.

In the step 4.1, it is assumed that a left boundary of the electromagnetic analysis periodic unit of the wire mesh is $X_1$ and a lower boundary of the electromagnetic analysis periodic unit of the wire mesh is $y_1$, then a right boundary $X_2$ of the electromagnetic analysis periodic unit and an upper boundary $y_2$ of the electromagnetic analysis periodic unit are determined by formulas 4.1 and 4.2:

$$X_2 = X_1 + R_x \tag{4.1}$$

$$y_2 = y_1 + R_y \tag{4.2}$$

In the step 4.2, the organization structure curve P of the organization structure of the wire mesh is discretized to obtain a coordinate point node for describing the organization structure of the wire mesh, and based on the coordinate point node, the coordinate point elec_node of the electromagnetic analysis periodic unit of the wire mesh is determined by a formula 4.3:

$$\text{elec\_node} = \text{node}(x_1 < x_i < x_2, y_1 < y_i < y_2) \tag{4.3}$$

In the step 5, based on the coordinate point elec_node of the electromagnetic analysis periodic unit of the wire mesh obtained in the step 4, a solid model of the electromagnetic analysis periodic unit of the wire mesh is established, and a reflection coefficient S11 and a transmission coefficient S21 of the wire mesh by analyzing the solid model are obtained. The step 5 specifically incudes:

step 5.1, using a periodic structure analysis module in a Computer Simulation Technology (CST) microwave studio; and based on the coordinate point elec_node of the electromagnetic analysis periodic unit of the wire mesh, using a command of three dimensional (3D) spline in a software to generate an electromagnetic analysis periodic unit curve of the electromagnetic analysis periodic unit of the wire mesh;

step 5.2, converting, based on a wire diameter d and a wire material in the step 1, the electromagnetic analysis periodic unit curve of the wire mesh into the solid model of the electromagnetic analysis periodic unit of the wire mesh through a command of Bond wire1; and step 5.3, setting boundary conditions, including: setting the boundary condition for each of X and Y directions as "unit cell", and setting the boundary condition for a Z direction as "and open space"; setting a working frequency and an incident angle of an electromagnetic wave, and determining a frequency domain solver for solving to thereby obtain the reflection coefficient S11 and the transmission coefficient S21 of the wire mesh.

Figure 8:
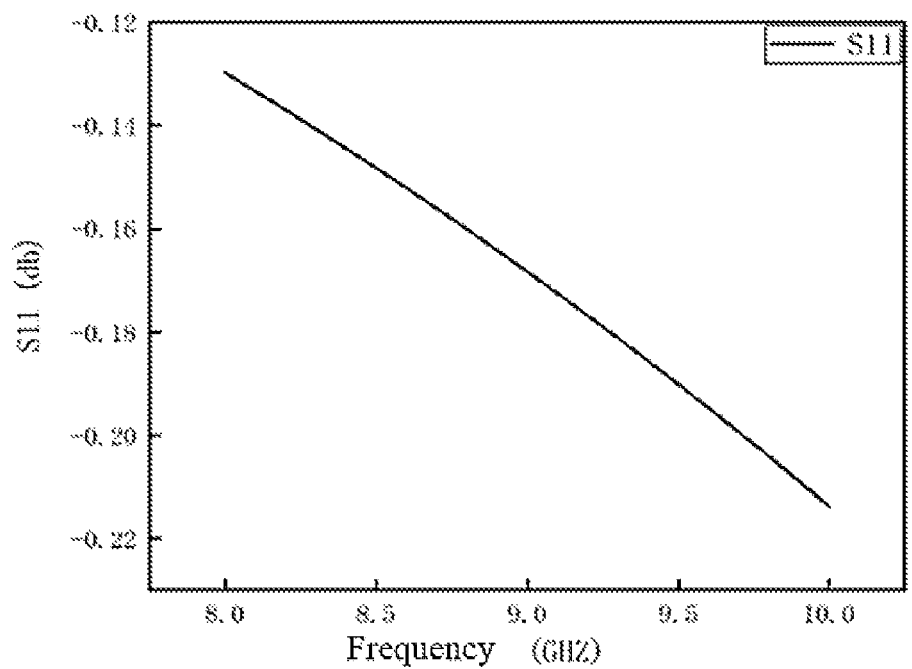
FIG. 8 illustrates a reflection coefficient of the double-comb closed warp satin weave wire mesh before deformation according to the embodiment 1 of the disclosure.
Figure 9:
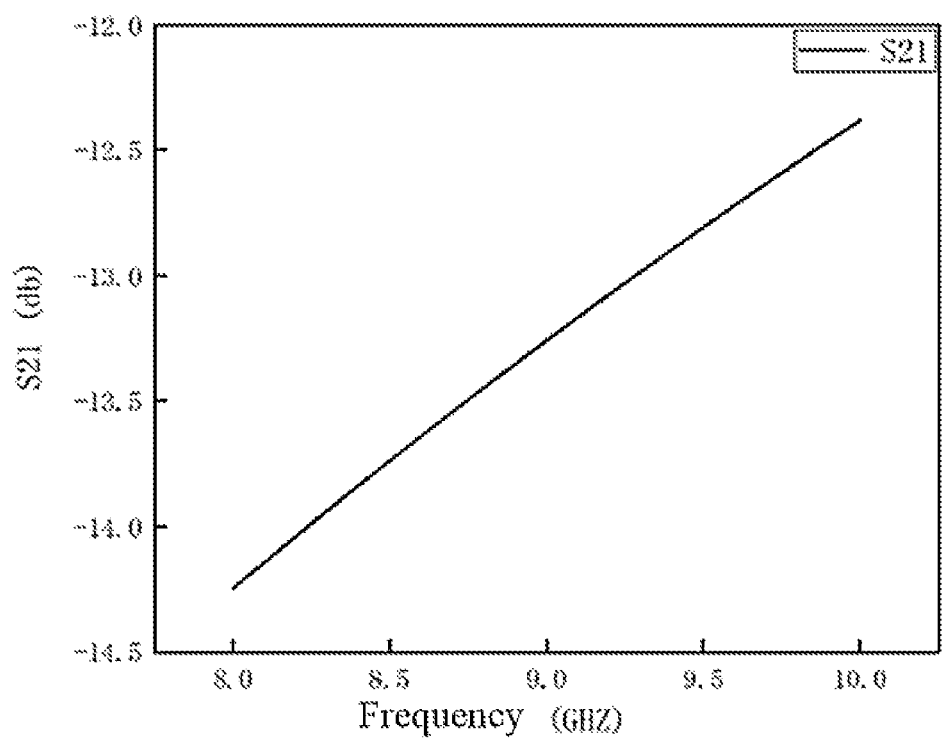
FIG. 9 illustrates a transmission coefficient of the double-comb closed warp satin weave wire mesh before deformation according to the embodiment 1 of the disclosure.

In order to accurately describe this embodiment 1, in this embodiment 1, the working frequency is 8 GHz-10 GHz, the incident angle of the electromagnetic wave is 5°, the wire diameter d is 0.05 mm, and the wire material is nickel, and the reflection coefficient S11 and the transmission coefficient S21 of the double-comb closed satin weave wire mesh before deformation are obtained, as shown in FIG. 8 and FIG. 9, respectively, where the x axis each of FIG. 8 and FIG. 9 represents the frequency, and the y axis of FIG. 8 represents the reflection coefficient S11, and they axis of FIG. 9 represents the transmission coefficient S21.

Figure 10:
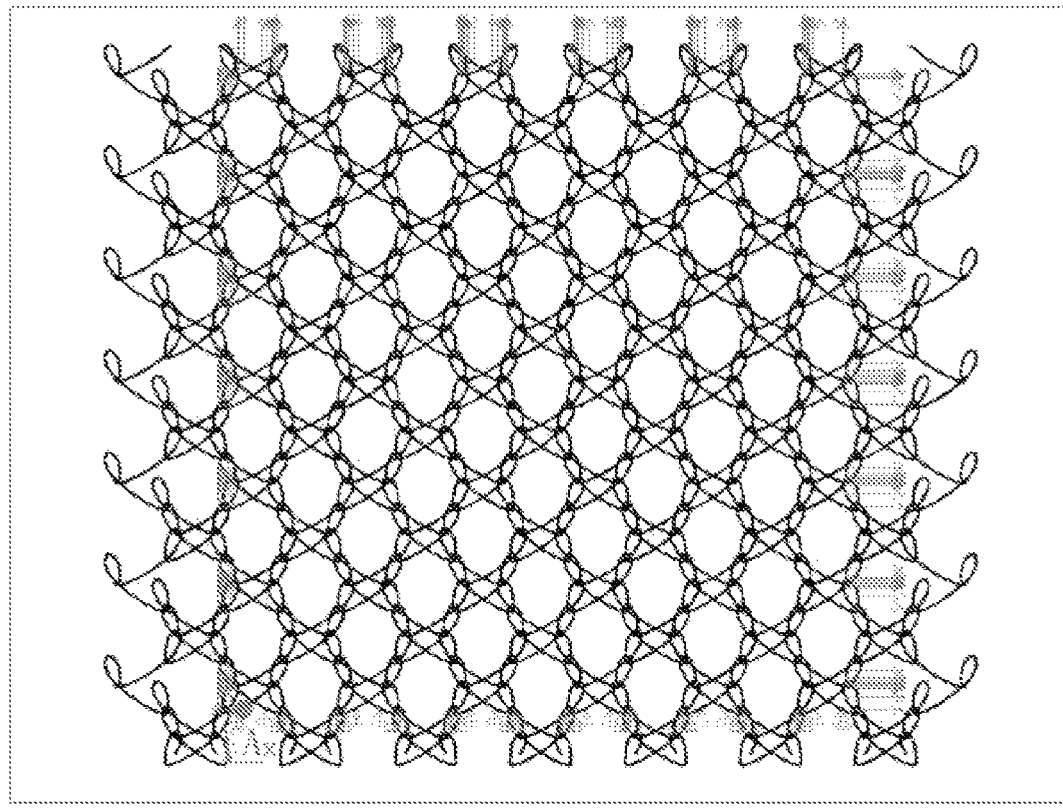
FIG. 10 illustrates a schematic diagram of static analysis of the double-comb closed warp satin weave wire mesh according to the embodiment 1 of the disclosure.
Figure 11:
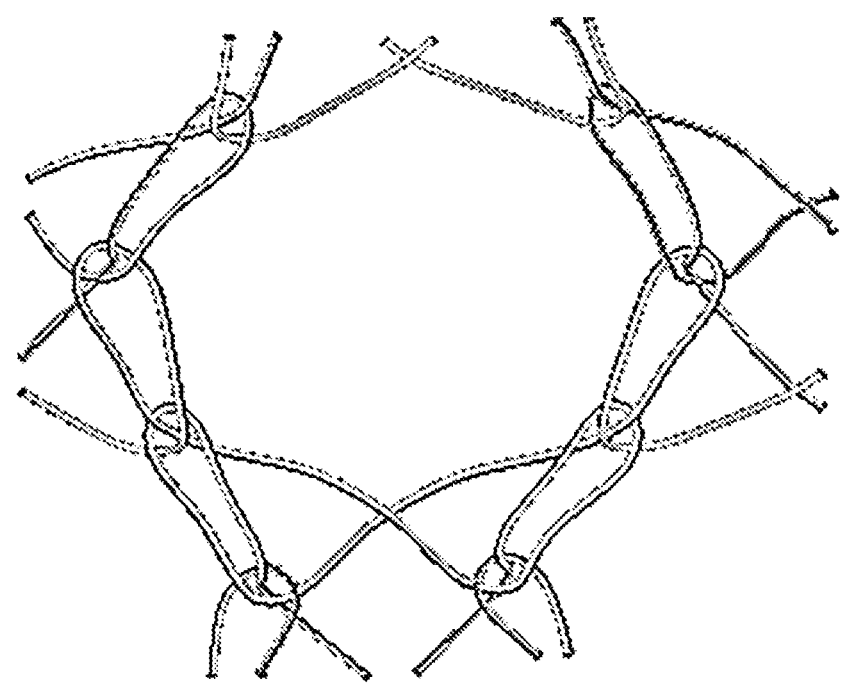
FIG. 11 illustrates a solid model of an electromagnetic analysis periodic unit of the double-comb closed warp satin weave wire mesh after deformation according to the embodiment 1 of the disclosure.

In the step 6, a reflection coefficient and a transmission coefficient of the wire mesh after deformation are determined. The step 6 specifically includes:

step 6.1, based on the coordinate point node for describing the organization structure of the wire mesh described in the step 4, using an ANSYS software to: use a beam element of Beam188 to simulate the wire mesh, define a shape and a size of a section of the beam element, and establish a finite element model of the wire mesh by using a BSPLIN command, set a contact type of the wire mesh as adhesive contact, apply a boundary condition and a load to the wire mesh to obtain a schematic diagram of static analysis of the wire mesh as shown in FIG. 10, and perform static analysis on the wire mesh, to thereby obtain a coordinate point deformtion_node for describing an organization structure of the double-comb closed warp satin weave wire mesh after deformation; and step 6.2, repeating the steps 4 and 5 based on the coordinate point deformtion_node for describing an organization structure of the double-comb closed warp satin weave wire mesh after deformation obtained in the step 6.1, to obtain a solid model of an electromagnetic analysis periodic unit 1 of the wire mesh after deformation as shown in FIG. 11, and the reflection coefficient S11 and the transmission coefficient S21 of the wire mesh after deformation.

Figure 12:
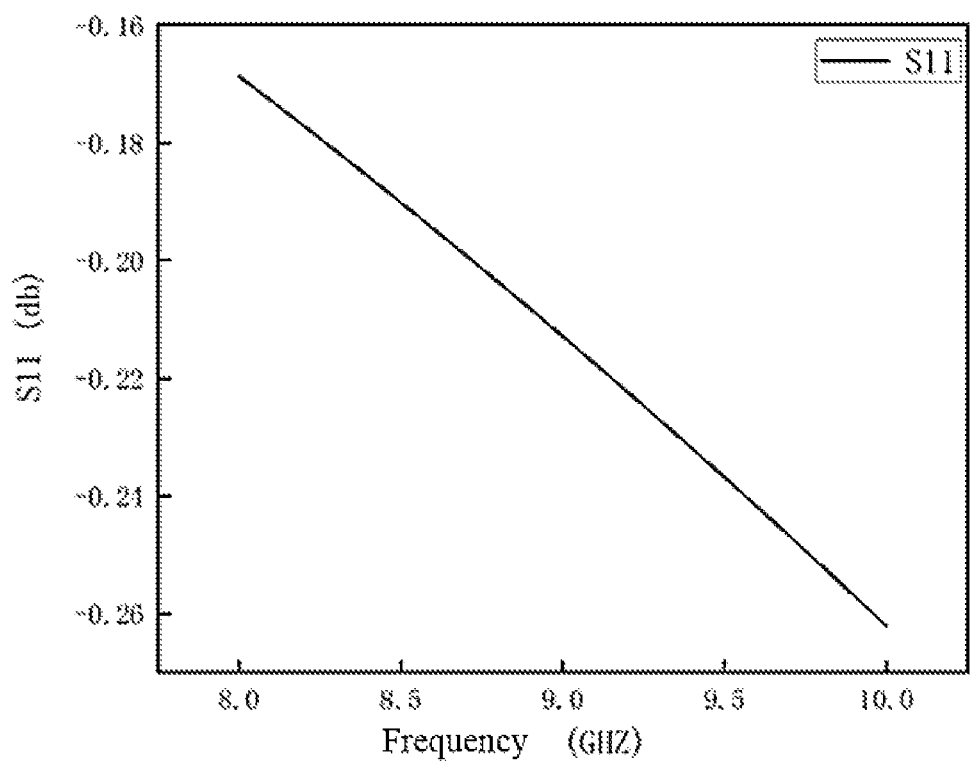
FIG. 12 illustrates a reflection coefficient of the double-comb closed warp satin weave wire mesh after deformation according to the embodiment 1 of the disclosure.
Figure 13:
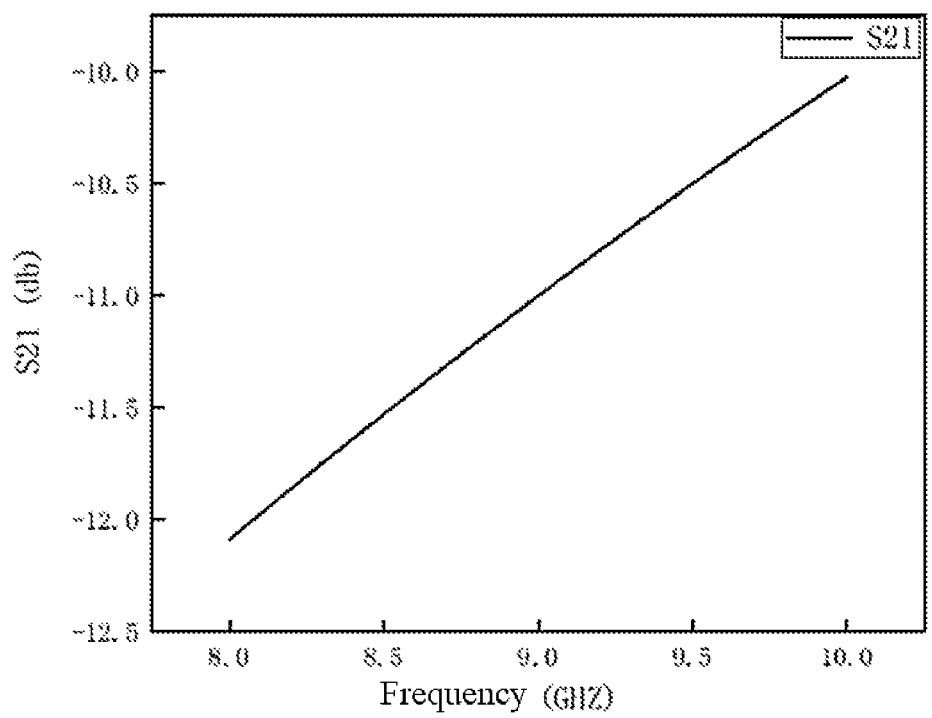
FIG. 13 illustrates a transmission coefficient of the double-comb closed warp satin weave wire mesh after deformation according to the embodiment 1 of the disclosure.

In order to accurately describe this embodiment 1, the Poisson ratio of the wire material is set to 0.3, the density of the wire material is 8 g/cm$^3$, the elastic modulus of the wire material is 762 MPa, and the load on the wire mesh per square meter is 15 15N/M. The working frequency is set to be in a range of 8 Ghz to 10 Ghz, the incident angle of the electromagnetic wave is 5°, the wire diameter d is 0.05 mm, and the wire material is nickel. The reflection coefficient S11 and the transmission coefficient S21 of the deformed wire mesh are shown in FIG. 12 and FIG. 13, respectively, where the x axis each of FIG. 12 and FIG. 13 represents the frequency, and the y axis of FIG. 12 represents the reflection coefficient S11, and the y axis of FIG. 13 represents the transmission coefficient S21.

What is claimed is:

1. An analysis method for transmission and reflection coefficients of a wire mesh of a mesh antenna, comprising:

step 1, inputting model parameters and simulation parameters of the wire mesh;

step 2, obtaining coordinate points of a minimum repeating unit of the wire mesh, and determining a minimum repeating unit curve $P_{00}$ of the minimum repeating unit, comprising:

step 2.1, deriving coordinate points $A_1$ of a single inclined coil of the wire mesh according to the model parameters in the step 1;

step 2.2, obtaining the coordinate points of the minimum repeating unit of the wire mesh according to the coordinate points $A_1$ of the single inclined coil obtained in the step 2.1 and an organization structure P of the wire mesh of the model parameters in the step 1; and step 2.3, solving the minimum repeating unit curve $P_{00}$ of the wire mesh according to the coordinate points of the minimum repeating unit obtained in the step 2.2;

step 3, performing vector superposition on the minimum repeating unit curve $P_{00}$ obtained in the step 2 to obtain an organization structure curve P of the organization structure of the wire mesh;

step 4, discretizing the organization structure curve P of the organization structure of the wire mesh obtained in the step 3, to extract a coordinate point elec_node of an electromagnetic analysis periodic unit of the wire mesh;

wherein the step 4 specifically comprises:

step 4.1, assuming that a left boundary of the electromagnetic analysis periodic unit of the wire mesh is $X_1$ and a lower boundary of the electromagnetic analysis periodic unit of the wire mesh is $y_1$, and determining a right boundary $X_2$ of the electromagnetic analysis periodic unit and an upper boundary $y_2$ of the electromagnetic analysis periodic unit by formulas 4.1 and 4.2:

$$X_2=X_1+R_x \qquad (4.1),$$

$$y_2=y_1+R_y \qquad (4.2);$$

step 4.2, discretizing the organization structure curve P of the organization structure of the wire mesh to obtain a coordinate point node for describing the organization structure of the wire mesh, and determining, based on the coordinate point node, the coordinate point elec_node of the electromagnetic analysis periodic unit of the wire mesh by a formula 4.3:

$$\text{elec\_node}=\text{node}(x_1 \le x_i \le x_2, y_1 \le y_i \le y_2) \qquad (4.3);$$

step 5, establishing, based on the coordinate point elec_node of the electromagnetic analysis periodic unit of the wire mesh obtained in the step 4, a solid model of the electromagnetic analysis periodic unit of the wire mesh, and obtaining a reflection coefficient S11 and a transmission coefficient S21 of the wire mesh by analyzing the solid model; and step 6, determining a reflection coefficient S11 and a transmission coefficient S21 of the wire mesh after deformation, comprising:

step 6.1, based on the coordinate point node for describing the organization structure of the wire mesh described in the step 4, using an ANSYS software to: use a beam element of Beam188 to simulate the wire mesh, define a shape and a size of a section of the beam element, and establish a finite element model of the wire mesh by using a BSPLIN command, set a contact type of the wire mesh as adhesive contact, apply a boundary condition and a load to the wire mesh and perform static analysis on the wire mesh, to thereby obtain a coordinate point deformtion_node for describing an organization structure of the wire mesh after deformation; and step 6.2, repeating the steps 4 and 5 based on the coordinate point deformtion_node for describing an organization structure of the wire mesh after deformation obtained in the step 6.1, to obtain a solid model of an electromagnetic analysis periodic unit of the wire mesh after deformation, and the reflection coefficient S11 and the transmission coefficient S21 of the wire mesh after deformation.

2. The analysis method for transmission and reflection coefficients of the wire mesh of the mesh antenna according to claim 1, wherein in the step 1, the model parameters comprise: the organization structure P of the wire mesh, a coil height b of the wire mesh, a row-column spacing w of the wire mesh, a wire diameter d, and a coil inclination angle α of the wire mesh; and wherein the simulation parameters comprise: a wire material, the load on the wire mesh, a Poisson ratio of the wire material, an elastic modulus of the wire material, a density of the wire material, a working frequency, an incident angle of an electromagnetic wave.

3. The analysis method for transmission and reflection coefficients of the wire mesh of the mesh antenna according to claim 1, wherein the step 2.1 specifically comprises:

step 2.11, describing, based on the model parameters in the step 1 and multiple coordinate points obtained by a computer simulation experiment, a single basic coil of the wire mesh, to obtain a coordinate point matrix A of the single basic coil;

step 2.12, adjusting, by using a rotation matrix $T_1$, the coordinate point matrix A of the single basic coil through a formula 2.1 to thereby obtain the coordinate points $A_1$ of the single inclined coil:

$$A_1=A \cdot T_1 \qquad (2.1),$$

where the rotation matrix $T_1$ is expressed in a formula 2.2:

$$T_1 = \begin{bmatrix} \cos\alpha & -\sin\alpha & 0 \\ \sin\alpha & \cos\alpha & 0 \\ 0 & 0 & 1 \end{bmatrix}, \qquad (2.2)$$

where α represents a coil inclination angle of the wire mesh.

4. The analysis method for transmission and reflection coefficients of the wire mesh of the mesh antenna according to claim 1, wherein the step 2.2 specifically comprises:

step 2.21, determining, based on the organization structure P of the wire mesh, a topological relationship between the minimum repeating unit and the single inclined coil; and step 2.22, obtaining the coordinate points of the minimum repeating unit of the wire mesh according to the coordinate points $A_1$ of the single inclined coil obtained in the step 2.1 and the topological relationship obtained in the step 2.21.

5. The analysis method for transmission and reflection coefficients of the wire mesh of the mesh antenna according to claim 1, wherein the step 2.3 comprises: obtaining the minimum repeating unit curve $P_{00}$ of the wire mesh by performing interpolating on the coordinate points of the minimum repeating unit obtained in the step 2.2 by using a periodic cubic spline curve, which comprises:

step 2.31, determining an incremental sequence, in which, $u_1 < u_2 < \ldots u_n$, and $\Delta u = u_{i+1} - u_i = 1$, (i=1, 2, ..., n−1), and expressing n−1 sub-curves of each composition curve 1 described by n coordinate points of the minimum repeating unit of the wire mesh as $s_i(u-u_i)$, where i=1, 2, ..., n−1, and $u \in [u_i, u_{i+1}]$, $s_i(u-u_i)$ is expressed in a formula 2.3:

$$s_i(u - u_i) = \begin{cases} x_i(u - u_i) = a_{ix} + b_{ix}(u - u_i) + c_{ix}(u - u_i)^2 + d_{ix}(u - u_i)^3 \\ y_i(u - u_i) = a_{iy} + b_{iy}(u - u_i) + c_{iy}(u - u_i)^2 + d_{iy}(u - u_i)^3 \quad i \in (1, 2, \ldots, n-1), \\ z_i(u - u_i) = a_{iz} + b_{iz}(u - u_i) + c_{iz}(u - u_i)^2 + d_{iz}(u - u_i)^3 \end{cases} \quad (2.3)$$

where $a_{ix}$, $b_{ix}$, $c_{ix}$, $d_{ix}$, $a_{iy}$, $b_{iy}$, $c_{iy}$, $d_{iy}$, $a_{iz}$, $b_{iz}$, $c_{iz}$, $d_{iz}$ represent undetermined coefficients corresponding to an analytic formula of an i-th sub-curve of the n−1 sub-curves respectively, and i=1, 2, ..., n−1;

step 2.32, based on that first derivatives of first and last endpoints of the composition curve 1 are equal, and second derivatives of first and last endpoints of the composition curve 1 are equal, determining a formula 2.4:

$$\begin{cases} \dot{x}_1(u_1 + 0 - u_1) = \dot{x}_{i-1}(u_i - 0 - u_{i-1}) \\ \dot{y}_1(u_1 + 0 - u_1) = \dot{y}_{i-1}(u_i - 0 - u_{i-1}) \\ \dot{z}_1(u_1 + 0 - u_1) = \dot{z}_{i-1}(u_i - 0 - u_{i-1}) \end{cases} \quad (2.4)$$
$$\begin{cases} \ddot{x}_1(u_1 + 0 - u_1) = \ddot{x}_{i-1}(u_i - 0 - u_{i-1}) \\ \ddot{y}_1(u_1 + 0 - u_1) = \ddot{y}_{i-1}(u_i - 0 - u_{i-1}) \\ \ddot{z}_1(u_1 + 0 - u_1) = \ddot{z}_{i-1}(u_i - 0 - u_{i-1}) \end{cases}$$

step 2.33, based on that a function value of each of coordinate points excepting for endpoints of the composition curve 1 on the i-th sub-curve is equal to a function value of each of coordinate points excepting for the endpoints of the composition curve 1 on an i+1-th curve of the n−1 sub-curves, a first derivative of each of coordinate points excepting for the endpoints of the composition curve 1 on the i-th sub-curve is equal to a first derivative of each of coordinate points excepting for the endpoints of the composition curve 1 on the i+1-th curve of the n−1 sub-curves, and a second derivative of each of coordinate points excepting for the endpoints of the composition curve 1 on the i-th sub-curve is equal to a second derivative of each of coordinate points excepting for the endpoints of the composition curve 1 on the i+1-th curve of the n−1 sub-curves, determining a formula 2.5:

$$\begin{cases} x_{i-1}(u_i - u_{i-1}) = x_i(u_i - u_i) \\ y_{i-1}(u_i - u_{i-1}) = y_i(u_i - u_i) \, (i = 2, 3, \ldots, n) \\ z_{i-1}(u_i - u_{i-1}) = z_i(u_i - u_i) \end{cases} \quad (2.5)$$
$$\begin{cases} \dot{x}_{i-1}(u_i - u_{i-1}) = \dot{x}_i(u_i - u_i) \\ \dot{y}_{i-1}(u_i - u_{i-1}) = \dot{y}_i(u_i - u_i) \, (i = 2, 3, \ldots, n); \\ \dot{z}_{i-1}(u_i - u_{i-1}) = \dot{z}_i(u_i - u_i) \end{cases}$$
$$\begin{cases} \ddot{x}_{i-1}(u_i - u_{i-1}) = \ddot{x}_i(u_i - u_i) \\ \ddot{y}_{i-1}(u_i - u_{i-1}) = \ddot{y}_i(u_i - u_i) \, (i = 2, 3, \ldots, n) \\ \ddot{z}_{i-1}(u_i - u_{i-1}) = \ddot{z}_i(u_i - u_i) \end{cases}$$

step 2.34, obtaining undetermined coefficients corresponding to an analytical formula of the composition curve 1 of the minimum repeating unit by combining the formulas 2.4 and 2.5, and thereby to obtain the minimum repeating unit curve $P_{00}$ of the minimum repeating unit.

6. The analysis method for transmission and reflection coefficients of the wire mesh of the mesh antenna according to claim 1, wherein in the step 3, the performing vector superposition on the minimum repeating unit curve $P_{00}$ to obtain an organization structure curve P of the organization structure of the wire mesh specifically comprises:

assuming, based on a superposition principle of the wire mesh and the minimum repeating unit curve $P_{00}$ obtained in the step 2, that a spacing in a direction x between the minimum repeating unit curve $P_{00}$ and a minimum repeating unit curve $P_{10}$ adjacent to the minimum repeating unit curve $P_{00}$ in the direction x is $R_x$, a spacing in a direction y between the minimum repeating unit curve $P_{00}$ and a minimum repeating unit curve POI adjacent to the minimum repeating unit curve $P_{00}$ in the direction y is $R_x$; obtaining a minimum repeating unit curve $P_{ij}$ of the organization structure with a difference of i unit in the direction x from the minimum repeating unit curve $P_{00}$ and a difference of j unit in the direction y from the minimum repeating unit curve $P_{00}$, by translating the minimum repeating unit curve $P_{00}$ by $iR_x$ in the direction x, and then translating the minimum repeating unit curve $P_{00}$ by $jR_y$ in the direction y; and expressing the organization structure curve P of the organization structure of the wire mesh in a formula 3.1:

$$P\{P_{ij}\}, i \in Z, j \in Z, 0 \leq i \leq a, 0 \leq j \leq c \quad (3.1),$$

where a represents a maximum number of minimum repeating unit curves of the organization structure of the wire mesh in the direction x, and c represents a maximum number of minimum repeating unit curves of the organization structure of the wire mesh in the direction y.

7. The analysis method for transmission and reflection coefficients of the wire mesh of the mesh antenna according to claim 1, wherein the step 5 specifically comprises:

step 5.1, using a periodic structure analysis module in a Computer Simulation Technology (CST) microwave studio; and based on the coordinate point elec_node of the electromagnetic analysis periodic unit of the wire mesh, using a command of three dimensional (3D) spline in a software to generate an electromagnetic analysis periodic unit curve of the electromagnetic analysis periodic unit of the wire mesh;

step 5.2, converting, based on a wire diameter d and a wire material in the step 1, the electromagnetic analysis periodic unit curve of the wire mesh into the solid model of the electromagnetic analysis periodic unit of the wire mesh through a command of Bond wire1; and step 5.3, setting boundary conditions, comprising: setting the boundary condition for each of X and Y directions as "unit cell", and setting the boundary condition for a Z direction as "and open space"; setting a working frequency and an incident angle of an electromagnetic wave, and determining a frequency domain solver for solving to thereby obtain the reflection coefficient S11 and the transmission coefficient S21 of the wire mesh.

\* \* \* \* \*